No. 869,436. PATENTED OCT. 29, 1907.
J. INGELLS.
MACHINE FOR MOLDING CONCRETE BLOCKS.
APPLICATION FILED FEB. 11, 1907.

3 SHEETS—SHEET 1.

Witnesses
Georgana Chace
Palmer A. Jones

Inventor
James Ingells
By Luther V. Moulton
Attorney

No. 869,436. PATENTED OCT. 29, 1907.
J. INGELLS.
MACHINE FOR MOLDING CONCRETE BLOCKS.
APPLICATION FILED FEB. 11, 1907.

3 SHEETS—SHEET 2.

Witnesses
Georgiana Chace
Palmer A. Jones.

Inventor
James Ingells
By Luther V. Moulton
Attorney

No. 869,436. PATENTED OCT. 29, 1907.
J. INGELLS.
MACHINE FOR MOLDING CONCRETE BLOCKS.
APPLICATION FILED FEB. 11, 1907.

3 SHEETS—SHEET 3.

Witnesses
Georgiana Chace
Palmer A. Jones

Inventor
James Ingells
By Luther V. Moulton
Attorney

UNITED STATES PATENT OFFICE.

JAMES INGELLS, OF MUSKEGON, MICHIGAN.

MACHINE FOR MOLDING CONCRETE BLOCKS.

No. 869,436.　　　　Specification of Letters Patent.　　　　Patented Oct. 29, 1907.

Application filed February 11, 1907. Serial No. 356,863.

*To all whom it may concern:*

Be it known that I, JAMES INGELLS, a citizen of the United States of America, residing at Muskegon, in the county of Muskegon and State of Michigan, have invented certain new and useful Improvements in Machines for Molding Concrete Blocks; and I do hereby declare the following to be a full, clear, and exact description of the invention, such as will enable others skilled in the art to which it appertains to make and use the same.

Figure 1:
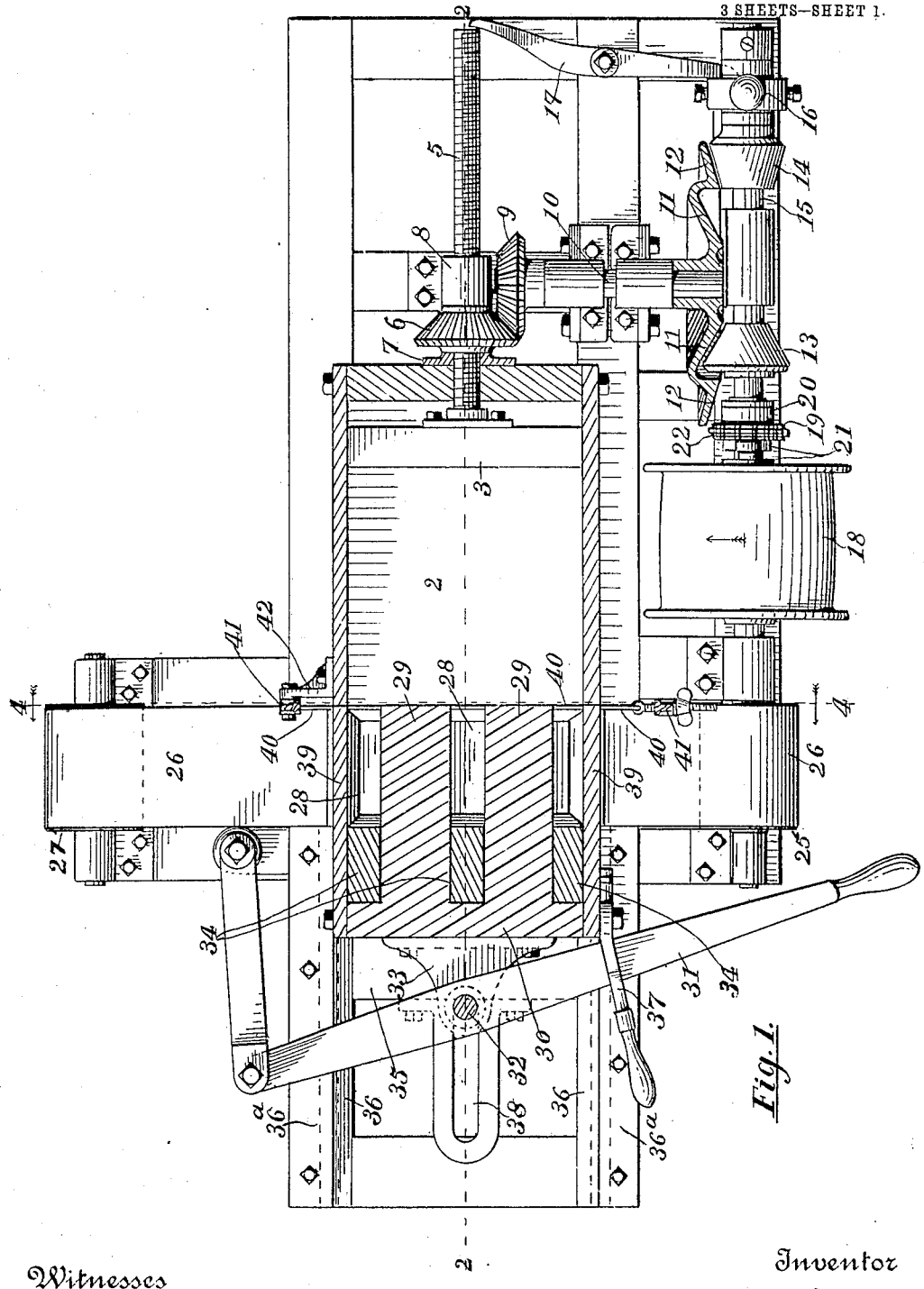
Figure 2:
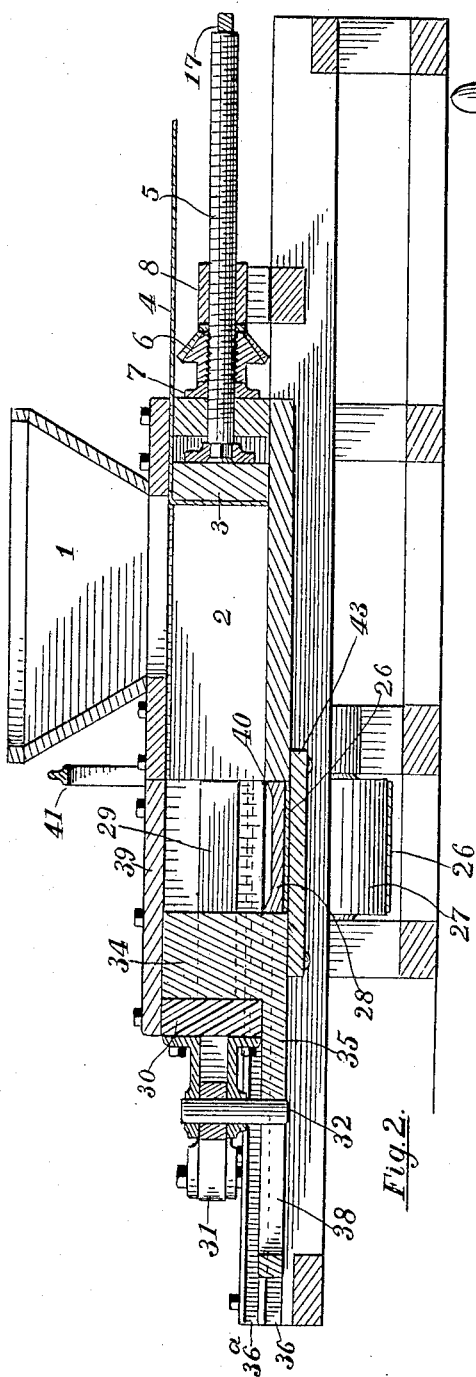
Figure 3:
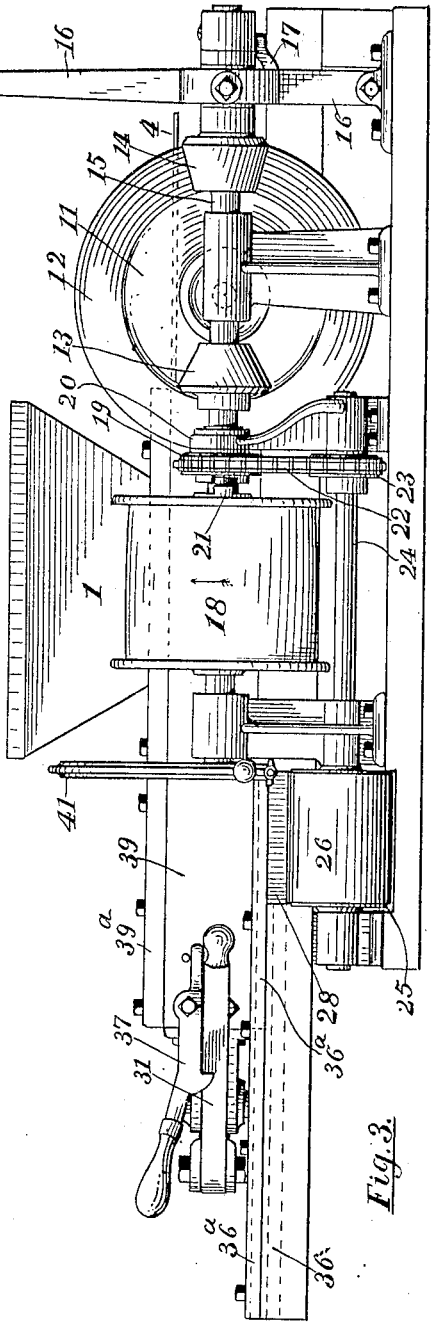
Figure 4:
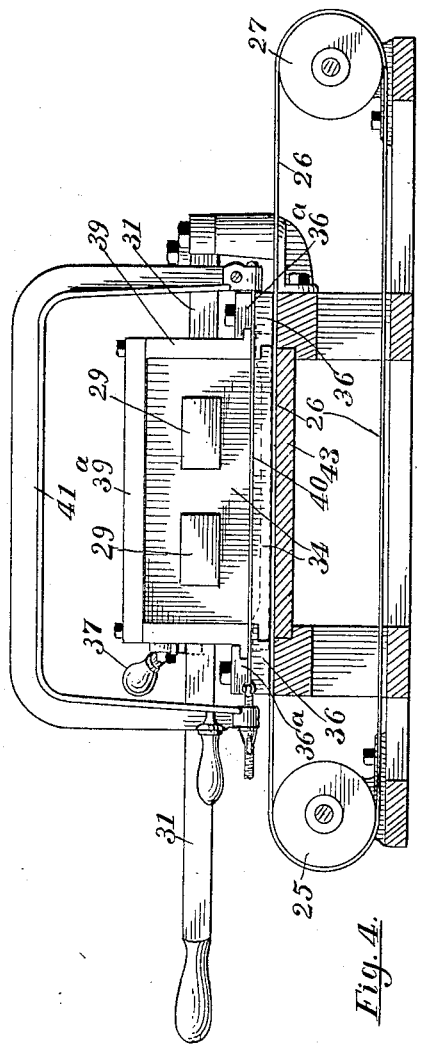
Figure 5:
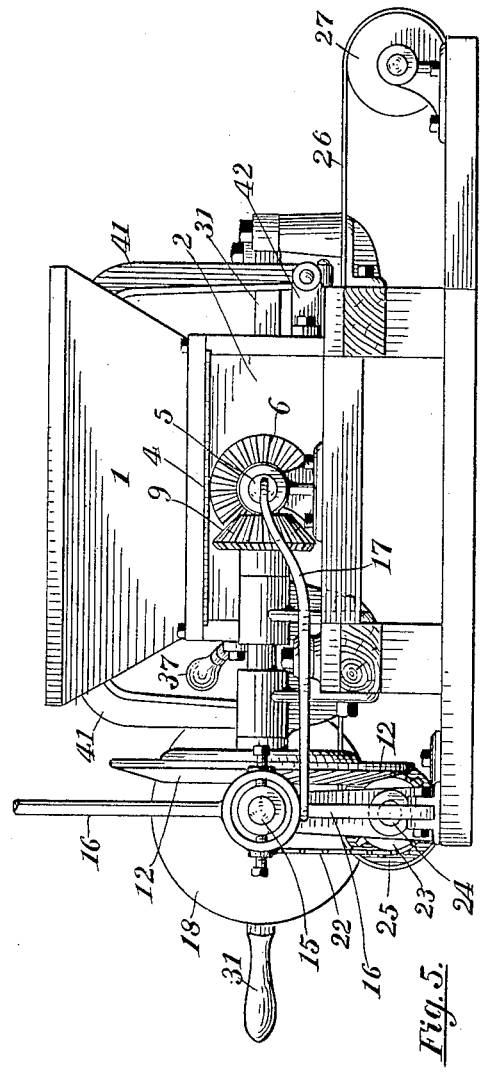

My invention relates to improvements in machines for molding concrete blocks, and its object is to provide the same with various new and useful features, hereinafter more fully described and particularly pointed out in the claims, reference being had to the accompanying drawings, in which:

Figure 1. is a plan view of a device embodying my invention with the upper part removed to show the construction; Fig. 2. a longitudinal vertical section on the line 2—2 of Fig. 1; Fig. 3. a side elevation of the device; Fig. 4. a transverse section on the line 4—4 of Fig. 1; and Fig. 5, an end elevation of the machine.

Like numbers refer to like parts in all of the figures.

1 represents a hopper in which the material properly prepared is placed and from which it passes downward into a receiving chamber 2 beneath the hopper. Traversing this chamber is a ram 3 to which is attached a plate 4 forming a slide to close the bottom of the hopper when the ram is moved forward to compress the material.

5 is a non-rotative screw attached to the ram and extending through a screw threaded miter gear 6, which constitutes a nut rotative between a boss 7 fixed on the chamber 2 and a bearing 8 in which bearing the screw 5 is slidable longitudinally. To rotate the gear 6 a similar gear 9 engages the same and is mounted on the end of a shaft 10 on the other end of which is a double bevel friction wheel having two concentric friction surfaces 11 and 12. Near this wheel and extending in the plane of the shaft 10 and at right angles thereto is a driving shaft 15 longitudinally movable in its bearings and thus moved by a manually operated lever 16 connected thereto in the usual manner. A lever 17 pivoted near the middle is engaged by the end of the screw 5 at one end and at the other end engages the lever 16 whereby as the screw reaches the limit of its rearward movement it moves the lever 16 and disengages the friction pinion 14 and stops the screw.

On the driving shaft is a friction bevel pinion 14 to engage the friction surface 12 when the driving shaft 15 is moved in one direction, and another bevel friction pinion 13 to oppositely engage the surface 11 when the said shaft is moved in the opposite direction, and when this shaft is in midposition, neither of these pinions will engage said surfaces. On the shaft 15 is mounted a driving pulley 18, operated by a belt driven by any convenient means. On the driving shaft near the pulley 18 is journaled a sprocket wheel 19 held from longitudinal movement by a hanger 20 in which the hub of the said wheel is rotative.

21 is a clutch which connects the pulley 18 and the sprocket wheel 19 when the driving shaft is moved to engage the friction pinion 13 with the surface 11.

22 is a sprocket chain engaging the wheel 19 and connecting the same with a similar wheel 23 mounted on a countershaft 24 on which shaft is a drum 25 which operates a carrier belt or apron 26 extending to a similar drum 27 at the other side of the machine. This belt is to carry out of the machine the plates 28 on which the concrete blocks are molded and left to dry. These plates are provided with recessed upper surfaces conforming in reverse to the desired shape of the face of the blocks formed thereon. Projecting above the plate 28 are cores 29 to form openings through the blocks, which cores are connected at their outer ends to a cross head 30 attached to the upper plate 39ᵃ and side walls 39, which constitute the top and ends of a mold in which the block is formed. To withdraw these cores and the ends and top of the mold from the block, a yoke 33 is attached to the rear of the cross head 30 and a lever 31 is pivoted to the yoke by a pin 32, which lever is manually operated. These parts 29, 30, 39 and 39ᵃ are mounted in ways 36ᵃ and longitudinally movable therein. A vertical wall 34 is provided opposite the ram 3 in which are openings in which the cores 29 are slidable and the top and ends of the mold slide on this wall. This wall is fixed on a bed 35 slidable in ways 36, said bed being provided with a slotted projection 38 traversed by the downwardly extended end of the pin 32 whereby the wall 34 is moved away from the block after the mold and cores have been withdrawn from the same. A latch 37 is provided to hold the lever and prevent the various movable parts from yielding during the forward movement of the ram 3.

To sever the molded block from the material remaining in the chamber 2 after the block has been compressed by the ram, I provide a wire 40 stretched in a yoke-shaped frame 41, which wire traverses the seam between the chamber 2 and the mold in which the block is formed. This frame is pivoted at one end to a bracket 42, and provided with a handle at the other end to manually turn it on the pivot and traverse the wire to sever the block from the remaining material.

43 is a bed plate to support the belt or carrier 26 and the plate 28.

What I claim is:

1. In a molding machine, a chamber to receive the material, means for ejecting the material from the chamber, a mold communicating with said chamber and comprising a wall opposite the chamber, and spaced apart therefrom, top and end plates slidable on said wall, and a detached bottom plate; means for retracting said top and end plates, and means for removing the bottom plate with the contents of the mold thereon.

2. In a molding machine, a chamber to receive the material and open at one end, means for ejecting the material from the chamber, a movable wall opposite the open end of the chamber and spaced apart therefrom, means for adjusting the wall toward and from the chamber, top and end plates slidable on the wall, and means for adjusting said top and end plates toward and from the chamber.

3. In a molding machine, a chamber to receive the material and open at one end, a ram traversing the chamber, means for reciprocating the ram, a wall opposite the open end of the chamber, and spaced apart therefrom and also having openings therethrough, cores slidable in said openings, top and end plates slidable on said wall, means for connecting the top plates the end plates and the cores to each other, means for reciprocating said connecting means and parts attached thereto, and a detached bottom plate.

4. In a molding machine, a chamber to receive the material and open at one end, a wall opposite the open end of the chamber and spaced apart therefrom, means for adjusting the wall toward and from the chamber, top and end plates slidable on the wall, means for reciprocating the said plates, a detached bottom plate, a belt or carrier to remove the bottom plate with the contents of the mold thereon, means for periodically moving said belt or carrier, and means for ejecting the contents of the chamber.

5. In a molding machine, a hopper, a chamber below the hopper and open at one end, a ram traversing the chamber, a plate attached to the ram and slidable between the hopper and chamber, a wall opposite the open end of the chamber and mounted on a bed plate slidable in ways, means for adjusting said bed plate toward and from the chamber, top and end plates slidable on said wall, cores slidable in openings in said wall, a cross head to which said plates and cores are attached, ways in which the cross head and attached parts are adjustable, means for adjusting the cross head and attached parts toward and from the chamber, a detached bottom plate, and means for removing said plate with the contents of the mold thereon.

6. In a molding machine, the combination of a hopper, a chamber beneath the hopper and open at one end, a ram traversing the chamber, means for operating the ram, a mold to receive the contents of the chamber, an independently adjustable wall to the mold, a slotted projection attached to said wall, adjustable top and ends to the mold, a lever pivoted to the same and having a pivot pin engaging the slot in said projection, and a detached bottom plate to the mold.

7. In a molding machine, a hopper, a chamber beneath the hopper and open at one end, a ram traversing the chamber, a plate attached to the ram and slidable between the hopper and chamber, means for reciprocating the ram and plate, a wall opposite the open end of the chamber, and slidable toward and from the chamber, a slotted projection on the wall, a top plate and end plates slidable on the wall, cores slidable in openings in the wall, a cross head connecting the said plates and cores, a lever connected to said cross head by a yoke and pivot pin, said pin also extended and traversing the slot in said extension, and a latch to hold the lever.

8. In a molding machine, a mold having a detached bottom plate, a ram to fill the mold, a longitudinally movable driving shaft, friction gearing connecting the shaft and ram to reciprocate the ram, means for manually moving the shaft, longitudinally, a belt to carry out the bottom plate, a drum to operate the belt, means for transmitting motion from the shaft to said drum, and a clutch to connect and disconnect said means with the shaft and operated by the longitudinal movement of the shaft.

9. In a molding machine, a mold having a detached bottom plate, a ram to fill the mold, a friction wheel to operate the ram, a driving shaft near the wheel and longitudinally movable, means for manually moving the shaft, friction pulleys on the shaft and oppositely and alternately engaging the wheel, a belt to carry the detached bottom plate, a drum to operate the belt, a shaft and sprocket wheel to operate the drum, a sprocket wheel rotative on the driving shaft, and a clutch to connect said last named sprocket wheel and the driving shaft.

10. In a molding machine, a ram, a screw to operate the ram, a wheel to operate the screw, pinions to oppositely and alternately engage the wheel, a longitudinally movable driving shaft on which the pinions are mounted, a lever to manually move the said shaft to engage a pinion with the wheel, and a lever engaged by the screw and adapted to automatically move the shaft to disengage the pinion.

11. In a molding machine, a ram, a screw attached to the ram, miter gears to operate the screw, a bevel friction wheel connected to one of said gears, a longitudinally movable driving shaft near said wheel, bevel pinions on said shaft to alternately and oppositely engage said wheel, a lever to manually move said shaft to engage a pinion with the wheel, and a lever engaged by the screw and adapted to engage said first named lever to automatically move said shaft to disengage the pinion.

In testimony whereof I affix my signature in presence of two witnesses.

JAMES INGELLS.

Witnesses:
LUTHER V. MOULTON,
GEORGIANA CHACE.